(12) United States Patent
Hasuka et al.

(10) Patent No.: US 6,899,968 B2
(45) Date of Patent: May 31, 2005

(54) FUEL CELL POWER SUPPLY DEVICE (75) Inventors: Yoshinobu Hasuka, Wako (JP); Hibiki Saeki, Wako (JP); Chihiro Wake, Wako (JP); Hiroyuki Abe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 498 days.

(21) Appl. No.: 10/157,727

(22) Filed: May 29, 2002

(65) Prior Publication Data
US 2002/0182461 A1 Dec. 5, 2002

(30) Foreign Application Priority Data

May 29, 2001 (JP) .................................... 2001-160744
May 8, 2002 (JP) .................................... 2002-132423

(51) Int. Cl.[7] .......................... H01M 8/00; H01M 8/04; H01M 8/12
(52) U.S. Cl. .............................. 429/23; 429/13; 429/22
(58) Field of Search .............................. 429/3, 7, 9, 13, 429/19, 22, 23, 24, 30, 34, 42, 49, 17, 27, 44, 46; 701/22; 320/102; 180/65.3; 205/782.5

(56) References Cited

U.S. PATENT DOCUMENTS

| | | | | |
|---|---|---|---|---|
| 5,441,819 A | * | 8/1995 | Voss et al. ..................... | 429/13 |
| 5,631,532 A | * | 5/1997 | Azuma et al. ............... | 320/102 |
| 6,342,316 B1 | * | 1/2002 | Okamoto et al. ............. | 429/19 |
| 6,387,556 B1 | * | 5/2002 | Fuglevand et al. ........... | 429/22 |
| 6,428,917 B1 | * | 8/2002 | Lacy et al. .................... | 429/13 |
| 6,684,135 B2 | * | 1/2004 | Uenodai et al. .............. | 701/22 |
| 6,691,810 B2 | * | 2/2004 | Hasuka et al. ............. | 180/65.3 |
| 6,761,987 B2 | * | 7/2004 | Marvin et al. ................ | 429/13 |
| 6,815,100 B2 | * | 11/2004 | Aoyagi et al. ................ | 429/13 |
| 2002/0114986 A1 | * | 8/2002 | Aoyagi et al. ................ | 429/23 |
| 2002/0172847 A1 | * | 11/2002 | Aoyagi et al. ................ | 429/24 |
| 2002/0192518 A1 | * | 12/2002 | Aoyagi et al. ................ | 429/23 |
| 2003/0044658 A1 | * | 3/2003 | Hochgraf et al. ............. | 429/22 |

* cited by examiner

Primary Examiner—Bruce F. Bell
Assistant Examiner—Robert Hodge
(74) Attorney, Agent, or Firm—Lahive & Cockfield, LLP; Anthony A. Laurentano, Esq.

(57) ABSTRACT

A power supply management control unit 14 has a target output current calculator 50 including a correction processor 52 which compares an upper-limit output current (Ifc_LMT) of a fuel cell with a requested output current (Ifc_CAL) calculated by requested output current calculator 42. When the requested output current (Ifc_CAL) exceeds the upper-limit output current (Ifc_LMT), limiting the output current of the fuel cell, the correction processor 52 corrects a target output current (Ifc_CMD) to be equal to a current which is calculated by applying an open voltage (Vcap_o) of a capacitor to a map (Ifc/Vfc map) representing the correlation between an output current and an output voltage of the fuel cell. After the limitation of the out-put current of the fuel cell is canceled, the correction processor 52 keeps correcting the target output current (Ifc_CMD) until the open voltage (Vcap_o) of the capacitor becomes equal to or greater than the output voltage of the fuel cell.

8 Claims, 7 Drawing Sheets

FUEL CELL POWER SUPPLY DEVICE

BACKGROUND OF THE INVENTION

1. Field of the Invention

The present invention relates to a fuel cell power supply device for limiting an output current of a fuel cell and recovering the fuel cell back into a normal state when the fuel cell suffers a malfunction.

2. Description of the Related Art

Figure 7:
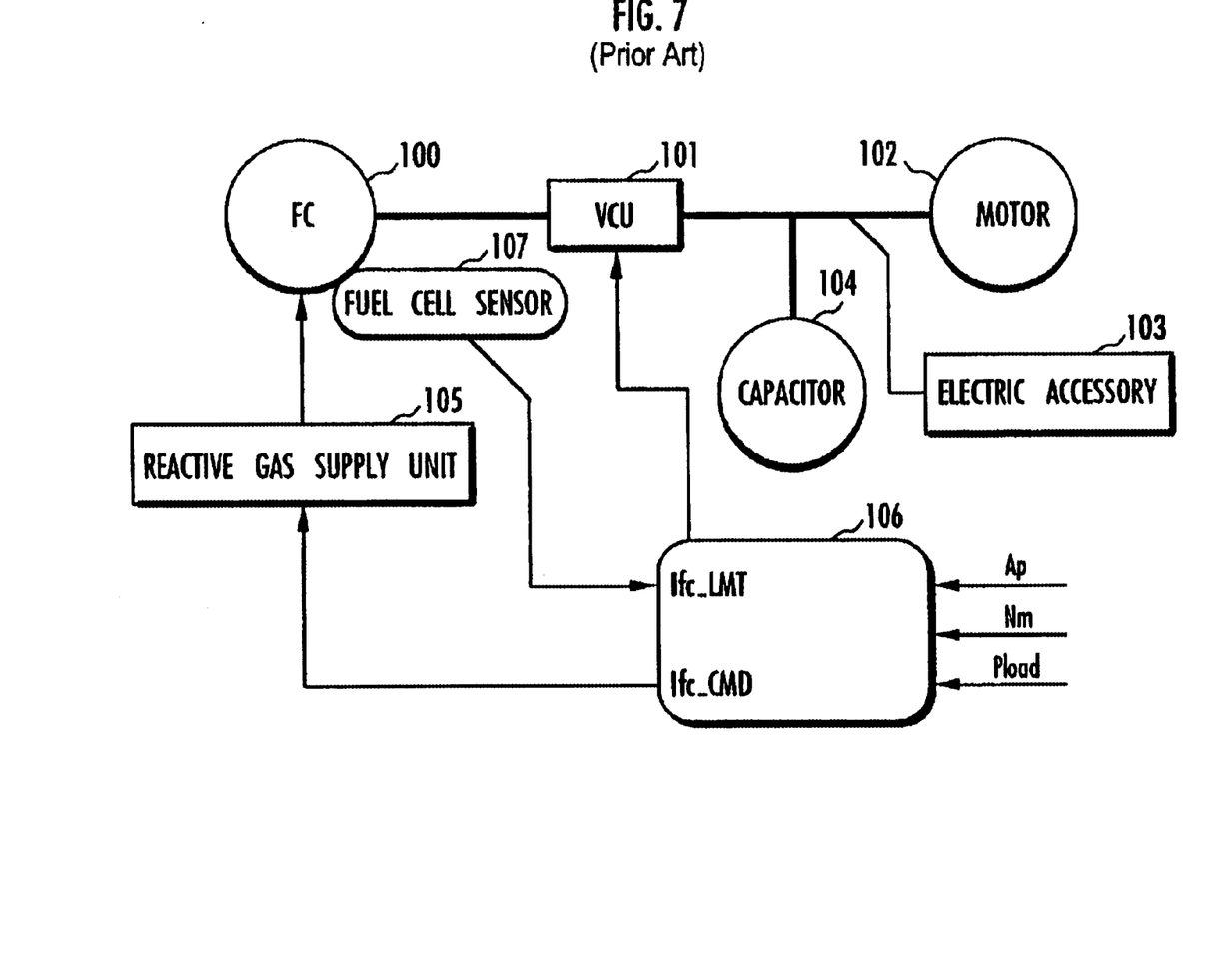
FIG. 7 is a block diagram of a conventional fuel cell power supply device.

There has heretofore been employed a fuel cell power supply device which uses a fuel cell stack 100 for a vehicle such as an electric vehicle or the like, as shown in FIG. 7 of the accompanying drawings. In the fuel cell power supply device shown in FIG. 7, the fuel cell stack 100 supplies electric energy through a current limiter 101 to a motor 102 and an electric accessory 103 such as an air-conditioning unit. An electric double layer capacitor 104 is connected parallel to the fuel cell stack 100 for supplementing the electric energy that is supplied to the motor 102 and the electric accessory 103.

The fuel cell stack 100 generates an amount of electric energy which is increased or reduced depending on the amount of reactive gases, i.e., a reducing gas such as hydrogen or the like and an oxidizing gas such as air or the like for extracting electric energy by reacting with the reducing gas, supplied from a reactive gas supply unit 105. A controller 106 controls the amount of reactive gases supplied from the reactive gas supply unit 105 to the fuel cell stack 100 so that the amount of electric energy required to operate the motor 102 and the electric accessory 103 will not become excessive or insufficient.

Specifically, the controller 106 determines a target output current (Ifc_CMD) of the fuel cell stack 100 depending on the amount of depression (Ap) of the accelerator pedal, the vehicle speed (Nm) of the vehicle, and the electric energy (Pload) consumed by the electric accessory 103, and controls the reactive gas supply unit 105 to supply an amount of reactive gases depending on the target output current (Ifc_CMD) to the fuel cell stack 100.

Since the controller 106 controls the amount of reactive gases supplied from the reactive gas supply unit 105 to the fuel cell stack 100, the current outputted from the fuel cell stack 100 basically remains large enough to provide the electric energy that is consumed by the motor 102 and the electric accessory 103. However, water produced in the fuel cell stack 100 when a current is generated by an electrochemical reaction of the reactive gases in the fuel cell stack 100 may possibly not be fully discharged from the fuel cell stack 100 but may be trapped in some of the cells (not shown) that make up the fuel cell stack 100.

If such water is trapped in some of the cells, then the reactive gases are not supplied to those cells, causing the cells to reduce their output currents. When the fuel cell stack 100 suffers such a malfunction, the cells whose output currents are reduced by the trapped water are likely to fail due to currents outputted from the other normal cells.

The controller 106 is designed to avoid the above drawback as follows: The controller 106 recognizes an operating state of the fuel cell stack 100 based on an output from a fuel cell sensor 107 which detects the pressure, rate, and temperature of the supplied reactive gases and individual states of the cells of the fuel cell stack 100, and determines an upper limit (Ifc_LMT) of the current that can be outputted from the fuel cell stack 100 based on the recognized operating state of the fuel cell stack 100.

When the upper-limit output current (Ifc_LMT) becomes equal to or lower than the target output current (Ifc_CMD), the controller 106 judges that the fuel cell stack 100 is malfunctioning, and controls the current limiter 101 to limit the current outputted from the fuel cell stack 100. When the current outputted from the fuel cell stack 100 is limited, the current outputted from the fuel cell stack 100 becomes short of the target output current (Ifc_CMD). At this time, the electric double layer capacitor 104 discharges a current to make up for current shortage, thus supplying a sufficient current according to the target output current (Ifc_CMD).

If the malfunctioning of the fuel cell stack 100 continues, however, the amount of electric energy stored in the electric double layer capacitor 104 progressively decreases, and hence the amount of electric energy discharged from the electric double layer capacitor 104 also progressively drops, failing to supply a sufficient current according to the target output current (Ifc_CMD).

SUMMARY OF THE INVENTION

It is therefore an object of the present invention to provide a fuel cell power supply device which is capable of quickly discharging any water trapped in a fuel cell stack to recover the fuel cell back into a normal state.

To achieve the above object, there is provided in accordance with the present invention a fuel cell power supply device comprising a PEM-type fuel cell, reactive gas supply means for supplying reactive gases to the fuel cell, current limiting means for limiting an output current of the fuel cell, target output current determining means for determining a target output current of the fuel cell depending on a requested current of a load when the fuel cell is connected to the load through the current limiting means and supplies a current to the load, fuel cell control means for controlling an amount of reactive gases supplied from the reactive gas supply means to the fuel cell based on the target output current, upper limit recognizing means for detecting an operating state of the fuel cell and recognizing an upper limit of a current which can be outputted from the fuel cell based on the detected operating state of the fuel cell, and water-discharge promoting means for comparing the target output current and the upper limit with each other, and, if the operating state of the fuel cell suffers a malfunction and the upper limit becomes equal to or smaller than the target output current, performing a current limiting process of limiting the output current of the fuel cell to make the target output current equal to or smaller than the upper limit with the current limiting means, and performing a supplied-amount-of-reactive-gases increasing process of increasing the amount of reactive gases supplied from the reactive gas supply means to the fuel cell for thereby promoting discharging of water trapped in the fuel cell.

With the above arrangement, if water produced in the fuel cell by an electrochemical reaction of the reactive gases in the fuel cell is trapped in the fuel cell and the amount of reactive gases supplied to the fuel cell decreases, and the target output current determined by the target output current determining means exceeds the upper limit recognized by the upper limit recognizing means, then the water-discharge promoting means performs the current limiting process and the supplied-amount-of-reactive-gases increasing process. The current limiting process limits the output current of the fuel cell and the amount of reactive gases consumed by the fuel cell is reduced. Therefore, the amount of reactive gases which is not consumed by the fuel cell but flows through the fuel cell increases. The supplied-amount-of-reactive-gases increasing process increases the amount of reactive gases supplied to the fuel cell, also increasing the amount of reactive gases which is not consumed by the fuel cell but flows through the fuel cell. Consequently, the ability to discharge the water trapped in the fuel cell is increased.

The fuel cell power supply device further includes an electric double layer capacitor connected parallel to the fuel cell through the current limiting means, for being discharged to supply the requested current when the output current of the fuel cell tends to run short of the requested current, storage means for storing data of a current/voltage map representing the correlation between an output voltage and an output current of the fuel cell, and open voltage recognizing means for recognizing an open voltage across the electric double layer capacitor, the water-discharge promoting means comprising means for performing a correcting process of increasing the target output current to a value equal to or higher than a current produced by applying the target output current to the current/voltage map and finishing the current limiting process when the malfunction of the operating state of the fuel cell is eliminated and the upper limit becomes greater than the target output current after the current limiting process and the supplied-amount-of-reactive-gases increasing process have been started.

The water-discharge promoting means finishes the current limiting process while the target output current is increased to a value equal to or higher than a current produced by applying the target output current to the current/voltage map.

The target output current is corrected such that the output of the fuel cell becomes equal to or greater than a value in equilibrium with the open voltage of the electric double layer capacitor, and an amount of reactive gases depending on the corrected target output current is supplied to the fuel cell.

If the output voltage of the fuel cell is equal to or higher than the open voltage of the electric double layer capacitor at the time the current limiting process is over, then the voltage for charging the electric double layer capacitor is not lowered. When the current limiting process is finished with the target output current thus corrected and the fuel cell and the electric double layer capacitor are directly connected to each other, the voltage across the electric double layer capacitor increases, and the electric double layer capacitor can be charged while the output of a current depending on the requested current is being maintained.

The fuel cell power supply device may further comprise an electric double layer capacitor connected parallel to the fuel cell through the current limiting means, for being charged by the fuel cell and discharged to supply the requested current when the output current of the fuel cell tends to run short of the requested current, the water-discharge promoting means comprising means for performing a correcting process of increasing the target output current when the malfunction of the operating state of the fuel cell is eliminated and the upper limit becomes greater than the target output current after the current limiting process and the supplied-amount-of-reactive-gases increasing process have been started.

When the target output current is returned to the upper limit by the current limiting process and the supplied-amount-of-reactive-gases increasing process, the water-discharge promoting means performs the correcting process of increasing the target output current. It is thus possible to charge the electric double layer capacitor while supplying the requested current to the load and increase the open voltage of the electric double layer capacitor up to the output voltage of the fuel cell, shifting to a state in which the electric double layer capacitor and the fuel cell can directly be connected to each other.

The fuel cell power supply device further comprises fuel cell voltage detecting means for detecting the output voltage of the fuel cell, the water-discharge promoting means comprising means for finishing the correcting process when an open voltage of the electric double layer capacitor becomes equal to or greater than the output voltage detected by the fuel cell voltage detecting means after the current limiting process is finished.

When the open voltage of the electric double layer capacitor becomes equal to or greater than the output voltage detected by the fuel cell voltage detecting means, i.e., when the charging of the electric double layer capacitor with the fuel cell is finished, the correcting process can be finished.

The water-discharge promoting means may intermittently perform the supplied-amount-of-reactive-gases increasing process to change the rate of reactive gases flowing through the fuel cell, thereby increasing the ability to discharge the water trapped in the fuel cell.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Fuel cell power supply devices according to first and second embodiments of the present invention will be described below with reference to FIGS. 1 through 6.

First, a fuel cell power supply device according to a first embodiment of the present invention will be described below.

Figure 1:
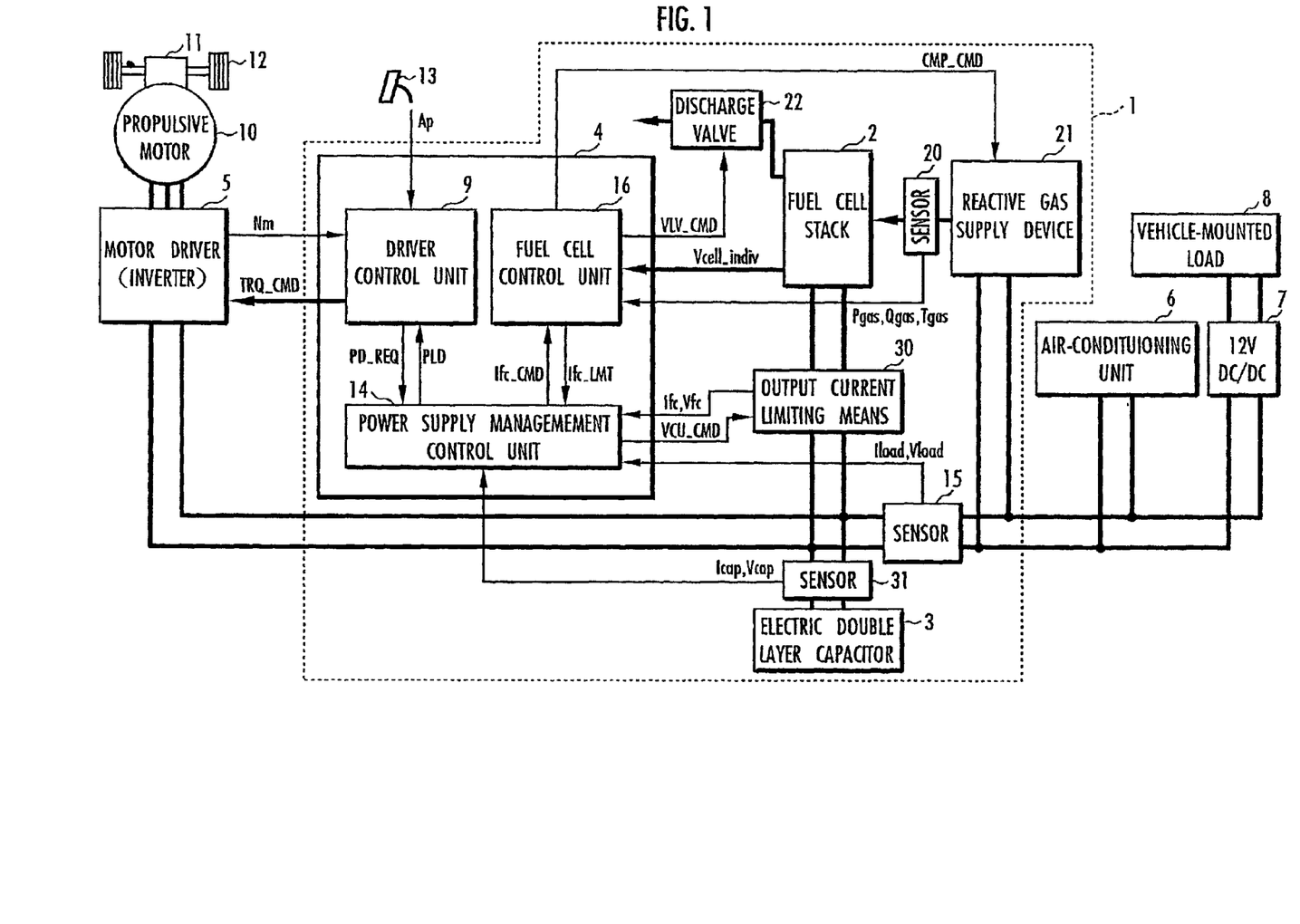
FIG. 1 is a block diagram of a fuel cell power supply device according to the present invention.

As shown in FIG. 1, a fuel cell power supply device 1 is mounted on a vehicle such as an electric vehicle and functions as a propulsive power supply for the vehicle. The fuel cell power supply device 1 is a hybrid fuel cell power supply device comprising a fuel cell stack 2 for outputting an electric current based on an electrochemical reaction between reactive gases of hydrogen and air, and an electric double layer capacitor 3 (hereinafter referred to as "capacitor 3") connected parallel to the fuel cell stack 2. The output electric energy produced by the fuel cell power supply device 1 is controlled by a controller 4 which comprises a microcomputer, a memory, and other components. The controller 4 has as its functions a driver control unit 9, a power supply management control unit 14, and a fuel cell control unit 16.

The output electric energy produced by the fuel cell power supply device 1 is supplied to a motor driver 5, an air-conditioning unit 6, and a 12-V vehicle-mounted load 8 through a DC/DC converter 7. The motor driver 5 controls currents flowing through the armatures of an electric motor 10 depending on a torque command value (TRQ_CMD) outputted from the driver control unit 9 of the controller 4. The drive power generated by the electric motor 10 is transferred to drive wheels 12 through a transmission 11.

The driver control unit 9 outputs a signal indicative of a motor-requested electric energy (PD_REQ) which is required by the motor driver 5 based on the amount of depression (Ap) of an accelerator pedal 13 and the rotational speed (Nm) of the electric motor 10, to the power supply management control unit 14 of the controller 4.

The power supply management control unit 14 is supplied with detected signals of a load current (I_load) and a load voltage (V_load) which are detected by a load sensor 15 in order to recognize the electric energy consumed by electric accessories other than the electric motor 10.

The power supply management control unit 14 takes into account an upper-limit output current (Ifc_LMT, corresponding to an upper limit according to the present invention) that can be supplied from the fuel cell control unit 16 (corresponding to a fuel cell control means according to the present invention) and indicative of an upper limit for the current that can be supplied from the fuel cell stack 2 and various states (an output voltage and a temperature) of capacitor cells (not shown) of the capacitor 3, and determines a target output current (Ifc_CMD) which is a target value for a current outputted from the fuel cell stack 2 depending on the sum of the motor-requested electric energy (PD_REQ) and the electric energy consumed by the electric accessories other than the electric motor 10.

The power supply management control unit 14 outputs a signal indicative of the target output current (Ifc_CMD) to the fuel cell control unit 16. The power supply management control unit 14 also outputs a signal indicative of an output limit electric energy (PLD) representing an upper limit for the electric energy that can be supplied from the fuel cell stack 2, to the driver control unit 9.

The fuel cell control unit 16 is supplied with detected signals outputted from a reactive gas sensor 20 and indicating a pressure (Pgas), a flow rate (Qgas), and a temperature (Tgas) of reactive gases (hydrogen and air) supplied to the fuel cell stack 2, and detected signals indicative of states (Vcell_indiv) of individual fuel cells that make up the fuel cell stack 2. The fuel cell control unit 16 determines the upper-limit output current (Ifc_LMT) in view of the state of the fuel cell stack 2 as recognized from these detected signals.

The driver control unit 9 outputs a signal indicative of a torque command (TRQ_CMD) to the motor driver 5 so as not to exceed the output limit electric energy (PLD) indicated by the power supply management control unit 14. The motor driver 5 controls the armature currents of the electric motor 10 to cause the electric motor 10 to generate a torque depending on the torque command (TRQ_CMD).

The fuel cell control unit 16 outputs a signal indicative of a target amount of reactive gases (CMP_CMD) supplied to the fuel cell stack 2 to a reactive gas supply device 21 (corresponding to a reactive gas supply means according to the present invention) so that the fuel cell stack 2 will output a current according to the target output current (Ifc_CMD). Based on the target amount of reactive gases (CMP_CMD), the reactive gas supply device 21 supplies air and hydrogen at a rate depending on the target output current (Ifc_CMD).

Hydrogen supplied from the reactive gas supply device 21 is supplied to hydrogen electrodes of the fuel cell stack 2 through an ejector (not shown) and a humidifier (not shown), and reacts electrochemically with oxygen in air supplied to air electrodes of the fuel cell stack 2, producing water which is discharged through a discharge valve 22. The opening of the discharge valve 22 is controlled by a control signal (VLV_CMD) supplied from the fuel cell control unit 16 in order to keep the pressure in the fuel cell stack 2 at a constant gradient depending on the pressures of the supplied air and hydrogen.

The fuel cell stack 2 has a water-cooled cooling unit (not shown). The fuel cell control unit 16 controls the rate and temperature of cooling water supplied to the water-cooled cooling unit depending on the temperature of the cooling water supplied to the water-cooled cooling unit and the temperature of the cooling water discharged from the water-cooled cooling unit.

The fuel cell power supply device 1 also has a capacitor sensor 31 for detecting a current (Icap) charged into and discharged from the capacitor 3 and a voltage (Vcap) across the capacitor 3. Detected signals from the capacitor sensor 31 are supplied to the power supply management control unit 14.

The fuel cell power supply device 1 further includes an output current limiting means 30 (including the function of a current limiting means according to the present invention) for detecting an output current (Ifc) and an output voltage (Vfc) from the fuel cell stack 2, the output current limiting means 30 having switching elements such as transistors or FETs for limiting the output current of the fuel cell stack 2. The output current limiting means 30 turns on or off the output current of the fuel cell stack 2 depending on the level (high/low) of a current limiting signal (VCU_CMD) outputted from the power supply management control unit 14.

The fuel cell control unit 16 controls the target amount of reactive gases (CMP_CMD) for the fuel cell stack 2 to cause the fuel cell stack 2 to output a current according to the target output current (Ifc_CMD) that is determined depending on the motor-requested electric energy (PD_REQ) and the electric energy consumed by the electric accessories as calculated from the load current (I_load) and the load voltage (V_load). Therefore, the output current from the fuel cell stack 2 basically remains large enough to provide the total electric energy that is consumed by the motor 10 and the electric accessories.

However, water produced in the fuel cell stack 2 by an electrochemical reaction of the reactive gases in the fuel cell stack 2 may possibly not be fully discharged from the fuel cell stack 2 but may be trapped in the fuel cell stack 2. If such water is trapped in the fuel cell stack 2, then the reactive gases are not supplied to the fuel cell stack 2, resulting in a malfunction in which the power generating efficiency of the fuel cell stack 2 drops. When the fuel cell stack 2 suffers such a malfunction, it fails to output a current according to the target output current (Ifc_CMD), and the motor 10 and the electric accessories run short of a required amount of electric energy.

The power supply management control unit 14 monitors the fuel cell stack 2 to check if it malfunctions or not. If the power supply management control unit 14 finds the fuel cell stack 2 malfunctioning, then the power supply management control unit 14 performs a current limiting process for limiting the output current of the fuel cell stack 2 and a supplied-amount-of-reactive-gases increasing process for increasing an amount of reactive gases supplied to the fuel cell stack 2 in order to eliminate the malfunction and restore the fuel cell stack 2 into a normal state.

Figure 2:
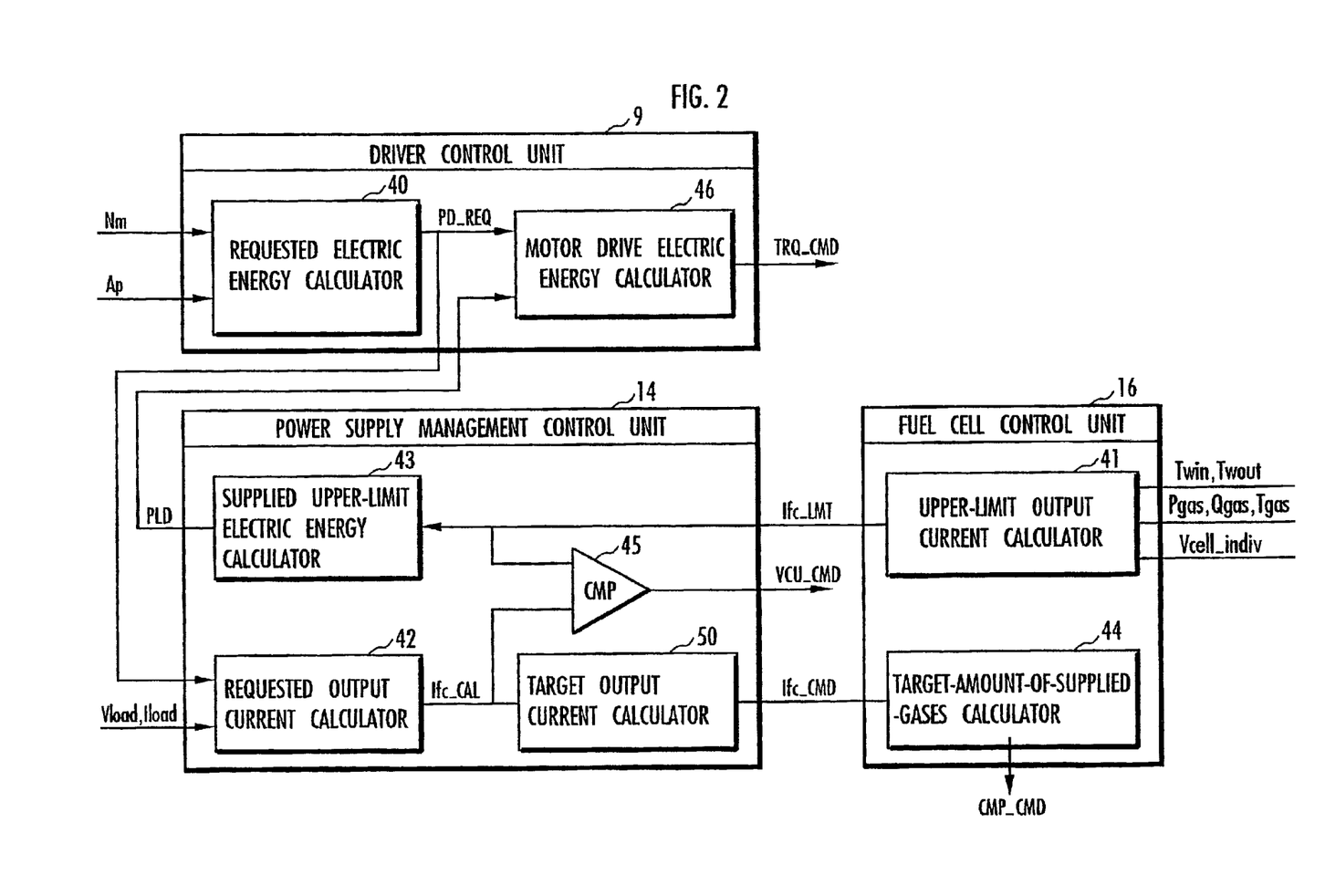
FIG. 2 is a detailed block diagram of a controller arrangement for carrying out a current limiting process, of the fuel cell power supply device shown in FIG. 1.

The current limiting process carried out by the power supply management control unit 14 will first be described below with reference to FIG. 2. The driver control unit 9 has a requested electric energy calculator 40 which calculates a motor-requested electric energy (PD_REQ) based on the amount of depression (Ap) of the accelerator pedal 13 (see FIG. 1) and the rotational speed (Nm) of the electric motor 10 (see FIG. 1) which is outputted from the motor driver 5, and outputs a signal indicative of the calculated motor-requested electric energy (PD_REQ) to the power supply management control unit 14.

The fuel cell control unit 16 has an upper-limit output current calculator 41 (corresponding to an upper limit recognizing means according to the present invention) which calculates an upper-limit output current (Ifc_LMT) based on detected signals outputted from the reactive gas sensor 20 and indicating a pressure (Pgas), a flow rate (Qgas), and a temperature (Tgas) of reactive gases supplied to the fuel cell stack 2, detected signals outputted from the fuel cell stack 2 and indicating states (Vcell_indiv) of the individual fuel cells that make up the fuel cell stack 2, and detected signals outputted from the cooling unit (not shown) and indicating the temperature (Twin) of the cooling water supplied to the cooling unit and the temperature (Twout) of the cooling water discharged from the cooling unit.

The power supply management control unit 14 has a current limiter 45 (corresponding to a water-discharge promoting means according to the present invention) which compares the upper-limit output current (Ifc_LMT) with a requested output current (Ifc_CAL, corresponding to a requested current of a load and a target output current according to the present invention) which is calculated by a requested output current calculator 42 (corresponding to a target output current determining means according to the present invention) based on a current converted from a total electric energy which is the sum of the motor-requested electric energy (PD_REQ) and the electric energy consumed by the electric accessories which is calculated from the load current (I_load) and the load voltage (V_load).

If the requested output current (Ifc_CAL) is equal to or lower than the upper-limit output current (Ifc_LMT), then the current limiter 45 judges that the fuel cell stack 2 is in a normal state, makes the current limiting signal (VCU_CMD) supplied to the output current limiting means 30 high in level, keeping the output current limiting means 30 on, thus directly connecting the fuel cell stack 2 and the capacitor 3 to each other.

If the upper-limit output current (Ifc_LMT) is lower than the requested output current (Ifc_CAL), then the current limiter 45 judges that the fuel cell stack 2 is malfunctioning with water trapped therein.

The current limiter 45 applies the current limiting signal (VCU_CMD) supplied to the output current limiting means 30 as a pulse signal whose output level switches between high and low levels, turning on or off the output current limiting means 30 thereby to limit the output current of the fuel cell stack 2. The current limiter 45 regulates the output current of the fuel cell stack 2 by changing the ratio of on-time in one period of the pulse signal (duty cycle).

By thus limiting the output current of the fuel cell stack 2 with the current limiter 45, the amount of electric energy generated by the fuel cell stack 2 is reduced, but the amount of reactive gases supplied to the fuel cell stack 2 is maintained at a level corresponding to the target output current (Ifc_CMD) that is determined by a target output current calculator 50 of the power supply management control unit 14 depending on the requested output current (Ifc_CAL). Therefore, the amount of reactive gases that flows through the fuel cell stack 2 without causing an electrochemical reaction, of all the amount of reactive gases that is supplied to the fuel cell stack 2, increases, thereby promoting the discharge of the water which has been trapped in the fuel cell stack 2 and has prevented the supply of reactive gases to the fuel cell stack 2.

The power supply management control unit 14 has a supplied upper-limit electric energy calculator 43 which calculates an output limit electric energy (PLD) depending on the upper-limit output current (Ifc_LMT). The requested electric energy calculator 40 calculates a motor-requested electric energy (PD_REQ) which is required by the motor driver 5, based on the amount of depression (Ap) of the accelerator pedal 13 and the rotational speed (Nm) of the electric motor 10.

The driver controller 9 also has a motor drive electric energy calculator 46 which compares the motor-requested electric energy (PD_REQ) and the output limit electric energy (PLD) with each other. If the motor-requested electric energy (PD_REQ) is equal to or smaller than the output limit electric energy (PLD), then the motor drive electric energy calculator 46 determines a torque command value (TRQ_CMD) depending on the motor-requested electric energy (PD_REQ). If the motor-requested electric energy (PD_REQ) exceeds the output limit electric energy (PLD), then the motor drive electric energy calculator 46 determines a torque command value (TRQ_CMD) depending on the output limit electric energy (PLD) and suppresses the electric energy consumed by the electric motor 10.

The fuel cell control unit 16 also has a target-amount-of-supplied-gases calculator 44 which determines a target amount of reactive gases (CMP_CMD) supplied from the reactive gas supply device 21 to the fuel cell stack 2 so that the fuel cell stack 2 will be supplied with an amount of reactive gases depending on the target output current (Ifc_CMD).

When the output current of the fuel cell stack 2 is limited by the above current limiting process, the output current of the fuel cell stack 2 runs short of the target output current (Ifc_CMD). However, the current shortage is supplemented by a current discharged from the capacitor 3.

Figure 3:
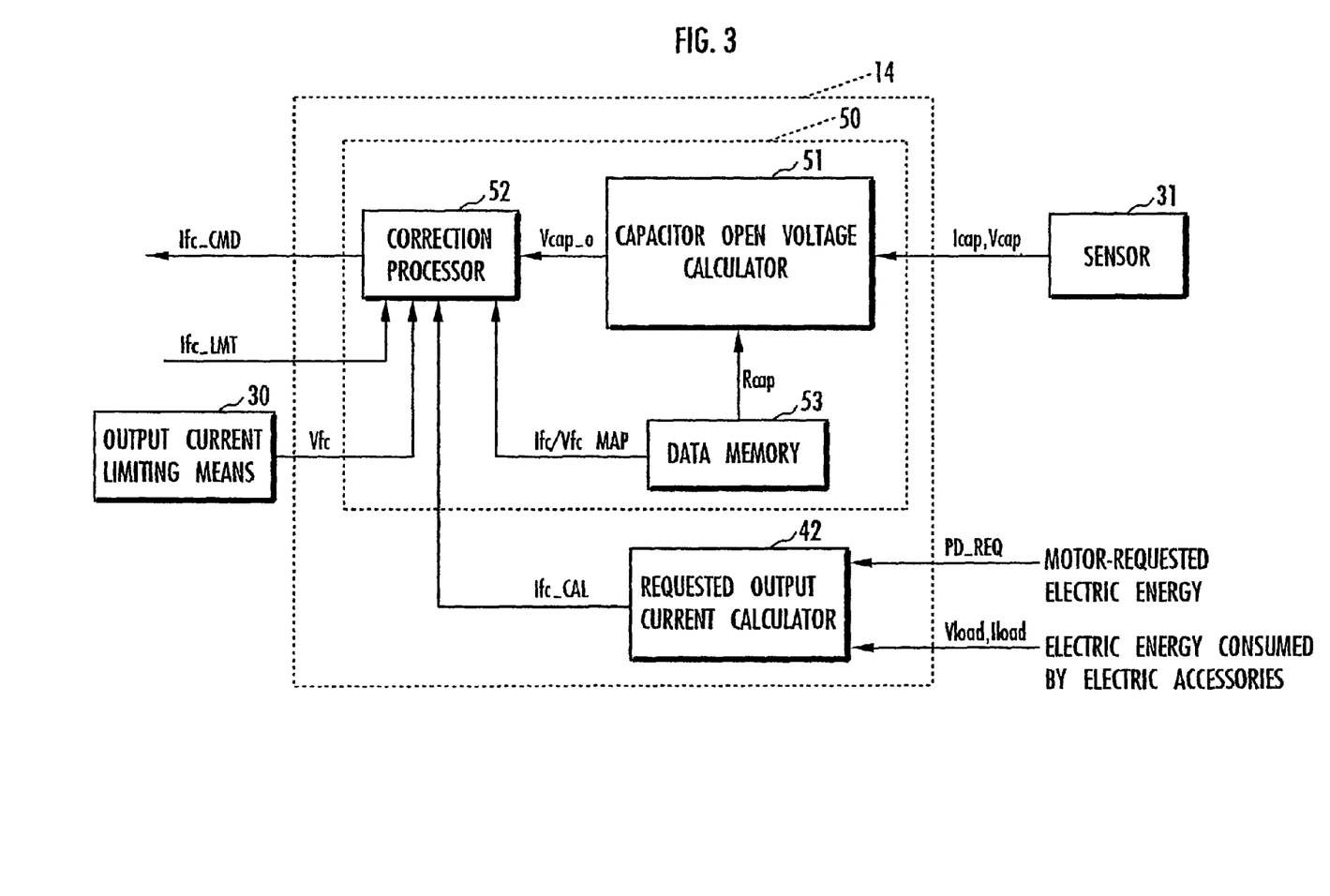
FIG. 3 is a detailed block diagram of a controller arrangement for carrying out a supplied-amount-of-reactive-gases increasing process, of the fuel cell power supply device shown in FIG. 1.

The supplied-amount-of-reactive-gases increasing process carried out by the power supply management control unit 14 will be described below with reference to FIG. 3. The power supply management control unit 14 has a target output current determining unit 50 which comprises a capacitor open voltage calculator 51 (corresponding to an open voltage recognizing means according to the present invention) for calculating an open voltage (Vcap_o) across the capacitor 3, a correction processor 52 (constituting a water-discharge promoting means according to the present invention) for correcting the requested output current (Ifc_CAL) when the upper-limit output current (Ifc_LMT) is equal to or lower than the requested output current (Ifc_

CAL), and a data memory 53 (corresponding to a storage means according to the present invention) for storing data of an internal resistance (Rcap) of the capacitor 3 and data of a map (Ifc/Vfc map) representing the correlation between the output current and voltage of the fuel cell stack 2.

The capacitor open voltage calculator 51 calculates an open voltage (Vcap_o) across the capacitor 3 based on a capacitor current (Icap) and a capacitor voltage (Vcap) detected by the capacitor sensor 31 and the internal resistance (Rap) of the capacitor 3 stored in the data memory 53, according to the following equation (1):

$$Vcap\_o = Vcap + Icap \times Rcap \quad (1)$$

The correction processor 52 compares the requested output current (Ifc_CAL) and the upper-limit output current (Ifc_LMT) with each other. If the upper-limit output current (Ifc_LMT) is in excess of the requested output current (Ifc_CAL), then the correction processor 52 judges that the fuel cell stack 2 is operating normally, and outputs the requested output current (Ifc_CAL) directly as the target output current (Ifc_CMD).

If the upper-limit output current (Ifc_LMT) becomes equal to or smaller than the requested output current (Ifc_CAL), then the correction processor 52 judges that the fuel cell stack 2 is malfunctioning, and performs a correcting process (corresponding to a process of correcting the target output current according to the present invention) for increasing the requested output current (Ifc_CAL) by a given amount (ΔIfc) to determine a target output current (Ifc_CMD) (Ifc_CMD=Ifc_CAL+ΔIfc) and outputs the determined target output current (Ifc_CMD).

By thus increasing the target output current (Ifc_CMD) with respect to the requested output current (Ifc_CAL), the target amount of reactive gases (CMP_CMD) determined depending on the target output current (Ifc_CMD) by the target-amount-of-supplied-gases calculator 44 (see FIG. 2) increases. As a result, the amount of reactive gases supplied from the reactive gas supply device 21 to the fuel cell stack 2 increases, increasing the ability to discharge the water trapped in the fuel cell stack 2.

A specific procedure for determining the target output current (Ifc_CMD) with the correction processor 52 in the above supplied-amount-of-reactive-gases increasing process will be described below with reference to FIG. 4.

Figure 4:
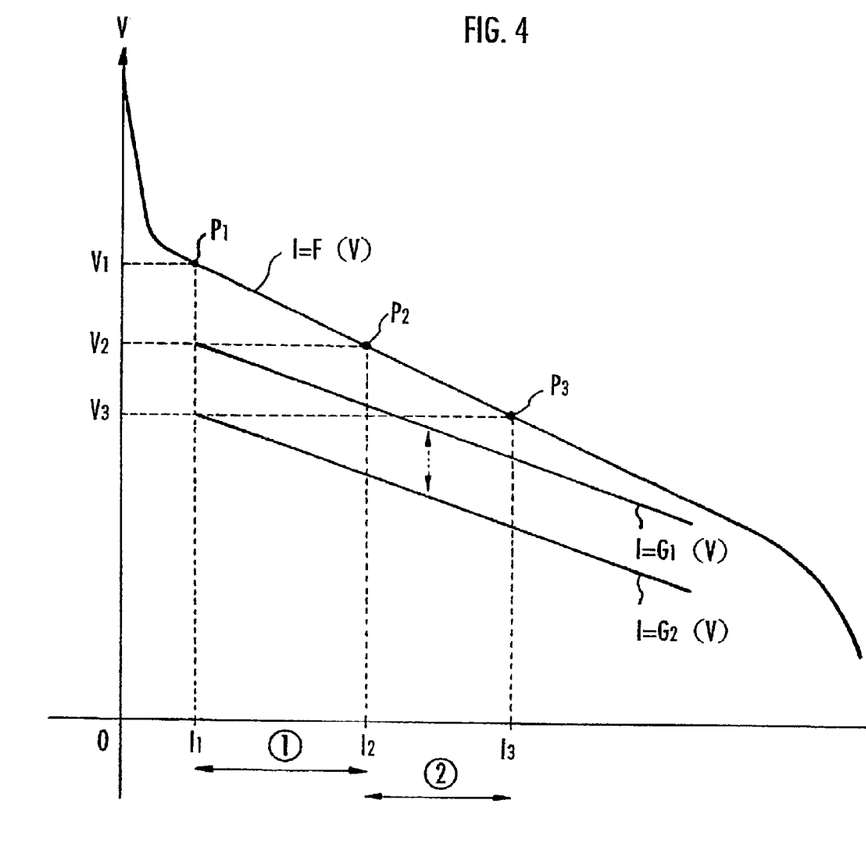
FIG. 4 is a graph illustrative of a process of correcting a requested output current in the supplied-amount-of-reactive-gases increasing process.

FIG. 4 is a graph showing output characteristics of the fuel cell stack 2 and the capacitor 3, the vertical axis representing voltage (V) and the horizontal axis current (I). In FIG. 4, a curve denoted by I=F (V) represents the output characteristics of the fuel cell stack 2 (the Ifc/Vfc map is produced based on the output characteristics I=F (V)), a curve denoted by I=G$_1$ (V) represents a linear curve produced by shifting the output characteristics of the capacitor 3 in a positive direction of the current axis (to the right in FIG. 4) by I$_1$ when the open voltage (Vcap_o) is V$_2$, and a curve denoted by I=G$_2$ (V) represents a linear curve produced by shifting the output characteristics of the capacitor 3 in the positive direction of the current axis by I$_1$ when the open voltage (Vcap_o) is V$_3$.

In FIG. 4, a point P$_2$ (I$_1$, V$_2$) represents a state of equilibrium in which the requested output current (Ifc_CAL) is equal to or lower than the upper-limit output current (Ifc_LMT), the fuel cell stack 2 is directly connected to the capacitor 3, and the charging and discharging current of the capacitor 3 (the output voltage of the capacitor 3=the open voltage of the capacitor 3) is 0. It is now assumed that the fuel cell stack 2 malfunctions and the upper-limit output current (Ifc_LMT) drops below the requested output current (Ifc_CAL) at the point P$_2$. In the state of equilibrium, the output current I$_2$ of the fuel cell stack 2 is controlled at the target output current (Ifc_CMD) by the fuel cell control unit 16.

If the upper-limit output current (Ifc_LMT) becomes equal to or lower than the requested output current (Ifc_CAL), then the current limiter 45 (see FIG. 2) starts the current limiting process described above. FIG. 4 shows that the output current of the fuel cell stack 2 is limited to I$_1$ by the current limiting process.

When the output current of the fuel cell stack 2 is limited to I$_1$, the output voltage of the fuel cell stack 2 rises to V$_1$. Since the shortage (I$_2$−I$_1$, ① in FIG. 4) of the output current I$_2$ of the fuel cell stack 2 in the state of equilibrium is made up for by the current discharged from the capacitor 3, the remaining charged quantity of the capacitor 3 progressively decreases, lowering the open voltage of the capacitor 3. The linear curve representing the output characteristics of the capacitor 3 is progressively shifted from I=G$_1$ (V) in a negative direction of the voltage axis (downward in FIG. 4).

If the fuel cell stack 2 recovers its normal state when the output characteristics of the capacitor 3 is shifted to I=G$_2$ (V), then the open voltage (Vcap_o) of the capacitor 3 is represented by V$_3$, whereas the output voltage of the fuel cell stack 2 is represented by V$_1$. Therefore, in order not to discharge the capacitor 3 and to supply a charging current from the fuel cell stack 2 to the capacitor 3 when the capacitor 3 and the fuel cell stack 2 are directly connected to each other, the target output current (Ifc_CMD) may be set to I$_3$ which represents a current value required to increase the output voltage of the fuel cell 2 up to V$_3$.

While the current limiting process is being carried out, the correction processor 52 determines a target output current (Ifc_CMD) (Ifc_CMD≧F (Vcap_o)) so as to be equal to or higher than a current value (=F (Vcap_o)) calculated by applying the open voltage (Vcap_o) of the capacitor 3 to the output characteristics I=F (V) of the fuel cell stack 2.

Consequently, while the current limiting process is being carried out, the fuel cell stack 2 is supplied with an amount of reactive gases depending on the current required to make the output voltage of the fuel cells stack 2 equal to or higher than the open voltage (Vcap_o) of the capacitor 3 when the fuel cell stack 2 is directly connected to the capacitor 3. Therefore, when the current limiting process is over and the fuel cell stack 2 is directly connected to the capacitor 3, the capacitor 3 is not discharged, but can be charged with the target output current (Ifc_CMD) being maintained.

After the current limiting process is finished, the correction processor 52 continues the supplied-amount-of-reactive-gases increasing process to progressively charge the capacitor 3 with a current (② in FIG. 4) represented by the difference between the target output current (Ifc_CMD) and the requested output current (Ifc_CAL), shifting the output characteristics of the capacitor 3 in the positive direction of the voltage axis.

When the output voltage (Vfc) of the fuel cell stack 2 becomes equal to or higher than the open voltage (Vcap_o) of the capacitor 3, i.e., when the supply of the charging current from the fuel cell stack 2 to the capacitor 3 is stopped, the correction processor 52 finishes the process of correcting the requested output current (Ifc_CAL), and finishes the supplied-amount-of-reactive-gases increasing process.

The target output current calculator 50 can thus charge the capacitor 3 to return it to the state of equilibrium P$_2$ (I$_1$, V$_2$) while the fuel cell stack 2 and the capacitor 3 are being directly connected to each other.

Figure 5:
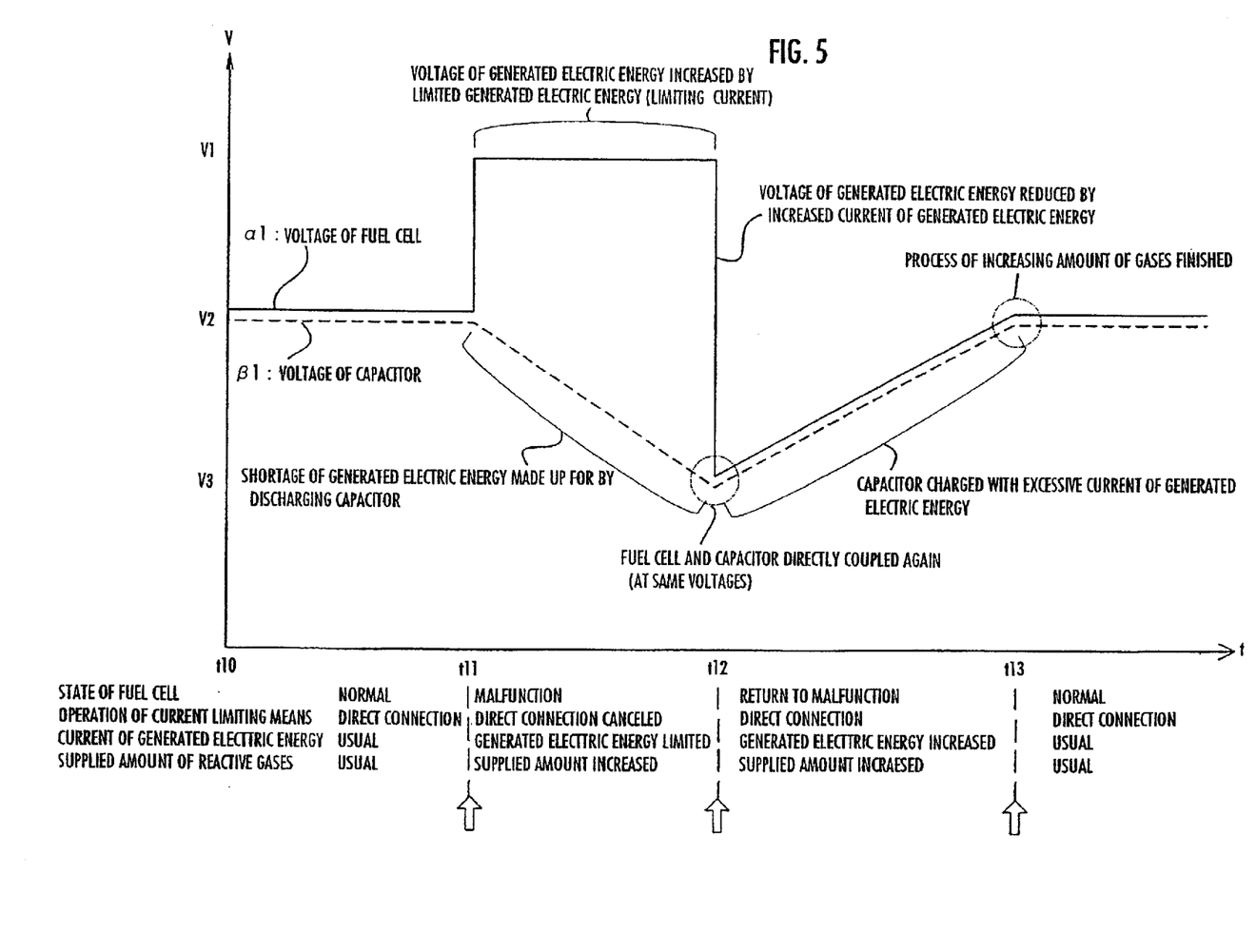
FIG. 5 is a graph showing the transition of output voltages of a fuel cell stack and an electric double layer capacitor according to a first embodiment of the present invention.

FIG. 5 is a graph showing the transition of the output voltages of the fuel cell stack 2 and the capacitor 3 when the current limiting process and the supplied-amount-of-reactive-gases increasing process are carried out, the vertical axis representing voltage (V) and the horizontal axis time (t). In FIG. 5, α1 represents the output voltage of the fuel cell stack 2, and β the output voltage of the capacitor 3.

The transition of the output voltages of the fuel cell stack 2 and the capacitor 3 will be described below chronologically. A time interval t10 to t11 indicates a state in which the fuel cell stack 2 operates normally and is directly connected to the capacitor 3. At time t11, the fuel cell stack 2 suffers a malfunction such as a cell voltage drop or the like, and the current limiter 45 (see FIG. 2) starts the current limiting process, increasing the output voltage of the fuel cells stack 2 from V2 to V1. In order to make up for a reduction in the amount of electric energy generated by the fuel cell stack 2 which is caused by the current limiting process, the capacitor 3 is discharged, and the amount of stored electric energy in the capacitor 3 is reduced, progressively reducing the output voltage of the fuel cells stack 2 from V2 to V3.

At time t12, the fuel cell stack 2 returns to its normal state and the requested output current (Ifc_CAL) becomes equal to or lower than the upper-limit output current (Ifc_LMT). At this time, the target output current calculator 50 determines a target output current (Ifc_CMD) so that the open voltage (Vcap_o) of the capacitor 3 will be equal to or higher than the output voltage of the fuel cell 2. The current limiting process is now over, and the fuel cell stack 2 and the capacitor 3 are directly connected to each other.

After the fuel cell stack 2 and the capacitor 3 are directly connected to each other at time t12, the capacitor 3 is progressively charged by a current which exceeds the requested current (Ifc_REQ) of the fuel cell stack 2 (t12 to t13). At time t13 when the open voltage (Vcap_o) of the capacitor 3 becomes equal to or higher than the output voltage of the fuel cell 2 and the charging current stops flowing from the fuel cell 2 into the capacitor 3, the correction processor 52 finishes the supplied-amount-of-reactive-gases increasing process.

A fuel cell power supply device according to a second embodiment of the present invention will be described below. The fuel cell power supply device according to the second embodiment has hardware details identical to those of the fuel cell power supply device according to the first embodiment, and is different from the fuel cell power supply device according to the first embodiment only with respect to a process after a malfunction of the fuel cell stack 2 is eliminated and the fuel cell stack 2 recovers its normal state. The process after a malfunction of the fuel cell stack 2 is eliminated and the fuel cell stack 2 recovers its normal state according to the second embodiment will be described below.

Figure 6:
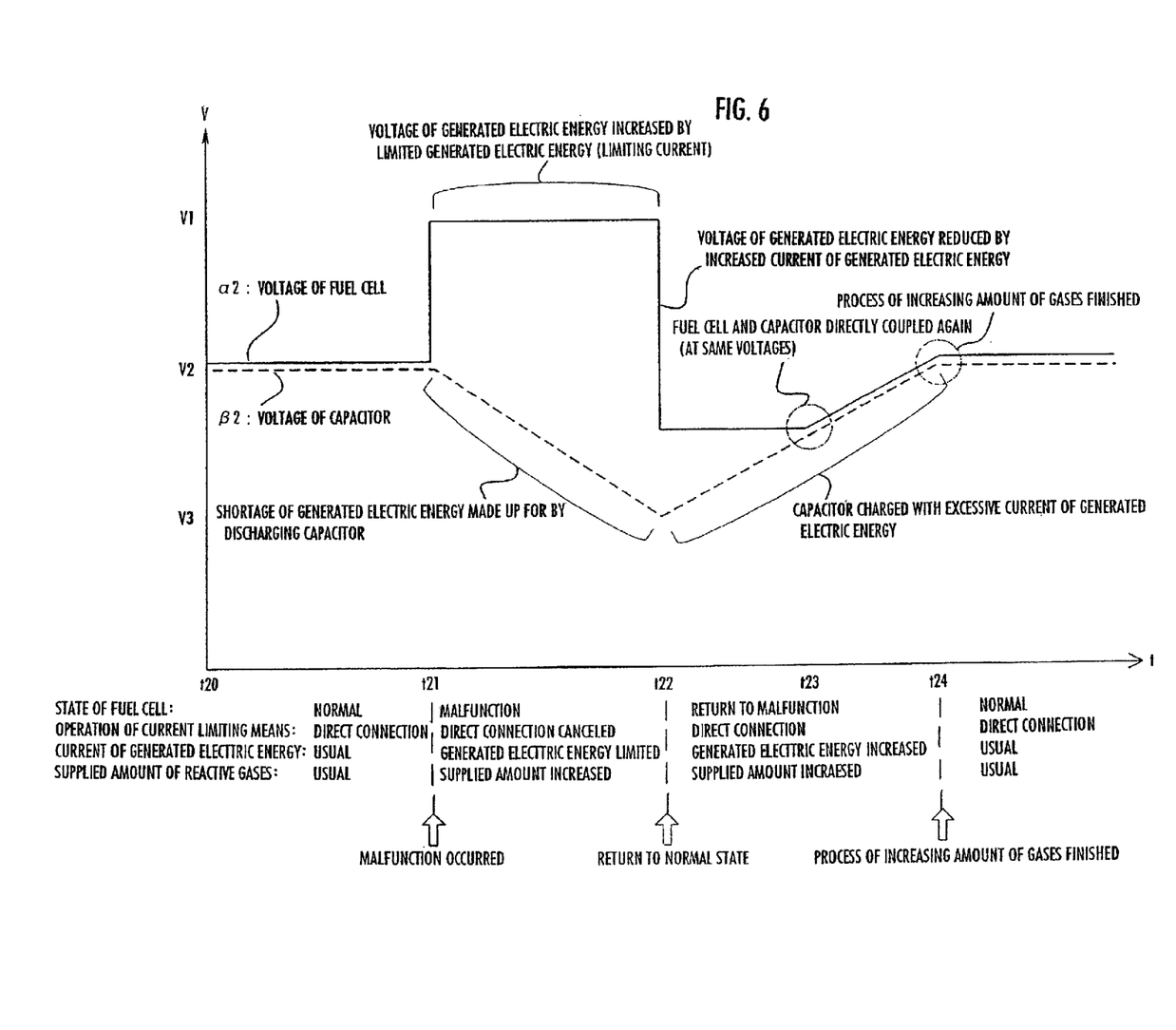
FIG. 6 is a graph showing the transition of output voltages of a fuel cell stack and an electric double layer capacitor according to a second embodiment of the present invention.

FIG. 6 is a graph showing the transition of the output voltages of the fuel cell stack 2 and the capacitor 3 when the current limiting process and the supplied-amount-of-reactive-gases increasing process are carried out, the vertical axis representing voltage (V) and the horizontal axis time (t). In FIG. 6, α2 represents the output voltage of the fuel cell stack 2, and β2 the output voltage of the capacitor 3.

The transition of the output voltages of the fuel cell stack 2 and the capacitor 3 will be described below chronologically. A time interval t20 to t21 indicates a state in which the fuel cell stack 2 operates normally and is directly connected to the capacitor 3. At time t21, the fuel cell stack 2 suffers a malfunction such as a cell voltage drop or the like, and the current limiter 45 (see FIG. 2) starts the current limiting process, increasing the output voltage of the fuel cells stack 2 from V2 to V1. In order to make up for a reduction in the amount of electric energy generated by the fuel cell stack 2 which is caused by the current limiting process, the capacitor 3 is discharged, and the amount of stored electric energy in the capacitor 3 is reduced, progressively reducing the output voltage of the fuel cells stack 2 from V2 to V3.

According to the second embodiment, when the fuel cell stack 2 recovers its normal state and the requested output current (Ifc_CAL) is equal to or lower than the upper-limit output current (Ifc_LMT) at time t22, the target output current calculator 50 does not use the Ifc/Vfc map, but determines the target output current (Ifc_CMD) to be of a value greater than the requested output current (Ifc_CAL) (this process corresponds to a process of increasing the target output current according to the present invention). In this case, the output voltage of the fuel cell stack 2 and the output voltage of the capacitor 3 are not necessarily equal to each other, and the fuel cell stack 2 and the capacitor 3 cannot directly be connected to each other unless their output voltages are equal to each other.

As the target output current (Ifc_CMD) is increased, a current is produced in excess of the requested current (Ifc_REQ) of the fuel cell stack 2, and progressively charges the capacitor 3 (t22 to t23).

When the output voltage of the capacitor 3 and the output voltage of fuel cell stack 2 become equal to each other, the current limiting process is finished, and the fuel cell stack 2 and the capacitor 3 are directly connected to each other at time t23. The capacitor 3 is progressively charged, and at time t24 when the open voltage (Vcap_o) of the capacitor 3 becomes equal to or higher than the output voltage of the fuel cell 2 and the charging current stops flowing from the fuel cell 2 into the capacitor 3, the correction processor 52 finishes the supplied-amount-of-reactive-gases increasing process.

In the first and second embodiments, the target output current calculator 50 continuously increases the requested output current (Ifc_CAL) with the correction processor 52. However, the target output current calculator 50 may intermittently increase the requested output current (Ifc_CAL) to change the rate of reactive gases flowing through the fuel cell stack 3 for thereby increasing the ability to discharge the water trapped in the fuel cell stack 2.

Furthermore, only when the current detected by the output current limiting means 30 becomes equal to or smaller than a threshold that is determined to be equal to or smaller than a switching limit current of the output current limiting means 30, the output current limiting means 30 may effect its switching operation to limit the output current of the fuel cell stack 2. With this arrangement, since switching limit current of the output current limiting means 30 may be small, the output current limiting means 30 may be reduced in size.

In the first and second embodiment, the fuel cell stack 2 and the electric double layer capacitor 3 are connected parallel to each other. However, the principles of the present invention are also applicable to other arrangements in which the fuel cell stack 2 and other electric storage means, e.g., a lead storage battery, a nickel hydrogen battery, a lithium ion battery, etc., are connected parallel to each other.

Although certain preferred embodiments of the present invention have been shown and described in detail, it should be understood that various changes and modifications may be made therein without departing from the scope of the appended claims.

What is claimed is:

1. A fuel cell power supply device comprising:

a Proton Exchange Membrane (PEM)-type fuel cell;

reactive gas supply means for supplying reactive gases to said fuel cell;

current limiting means for limiting an output current of said fuel cell;

target output current determining means for determining a target output current of said fuel cell depending on a requested current of a load when said fuel cell is connected to said load through said current limiting means and supplies a current to said load;

fuel cell control means for controlling an amount of reactive gases supplied from said reactive gas supply means to said fuel cell based on said target output current;

upper limit recognizing means for detecting an operating state of said fuel cell and recognizing an upper limit of a current which can be outputted said fuel cell based on the detected operating state of the fuel cell; and water-discharge promoting means for comparing said target output current end amid upper limit with each other, and, if the operating state of the fuel cell suffers a malfunction and said upper limit becomes equal to or smaller than said target output current, performing a current limiting process of limiting the output current of said fuel cell to make said target output current equal to or smaller than said upper limit with said current limiting means, and performing a supplied-amount-of-reactive-gases increasing process of increasing the amount or reactive gases supplied from said reactive gas supply means to said fuel cell for thereby promoting discharging of water trapped in said fuel call.

2. A fuel cell power supply device according to claim 1, further comprising:

an electric double layer capacitor connected parallel to said fuel call through said current limiting means, for being discharged to supply said requested current when the output current of said fuel cell tends to run short of said requested current;

storage means for storing data of a current/voltage map representing the correlation between an output voltage and an output current of said fuel cell; and open voltage recognizing means for recognizing an open voltage across said electric double layer capacitor;

said water-discharge promoting means comprising means for performing a correcting process of increasing said target output current to a value equal to or higher than a current produced by applying said target output current to said current/voltage map and finishing said current limiting process when the malfunction of the operating state of said fuel cell is eliminated and said upper limit becomes greater than said target output current after said current limiting process and said supplied-amount-of-reactive-gases increasing process have been started.

3. A fuel cell power supply device according to claim 1, further comprising:

an electric double layer capacitor connected parallel to said fuel call through said current limiting means, for being charged by said fuel cell and discharged to supply said requested current when the output current of said fuel cell tends to run short of said requested current;

said water-discharge promoting means comprising means for performing a correcting process of increasing said target output current when the malfunction of the operating state of said fuel cells is eliminated and said upper limit becomes greater than said target output current after said current limiting process and said supplied-amount-of-reactive-gases increasing process have been started.

4. A fuel cell power supply device according to claim 2, further comprising:

fuel cell voltage detecting means for detecting the output voltage of said fuel cell;

said water-discharge promoting means comprising means for finishing said correcting process when an open voltage of said electric double layer capacitor becomes equal to or greater than the output voltage detected by said fuel cell voltage detecting means after said current limiting process is finished.

5. A fuel cell power supply device according to claim 1, wherein said water-discharge promoting means comprises means for intermittently performing said supplied-amount-of-reactive-gases increasing process.

6. A fuel cell power supply device according to claim 3, further comprising:

fuel cell voltage detecting means for detecting the output voltage of said fuel cell;

said water-discharge promoting means comprising means for finishing said correcting process when an open voltage of said electric double layer capacitor becomes equal to or greater than the output voltage detected by said fuel cell voltage detecting means after said current limiting process is finished.

7. A fuel cell power supply device according to claim 2, wherein said water-discharge promoting means comprises means for intermittently performing said supplied-amount-of-reactive-gases increasing process.

8. A fuel cell power supply device according to claim 3, wherein said water-discharge promoting means comprises means for intermittently performing said supplied-amount-of-reactive-gases increasing process.

* * * * *